US010785330B2

(12) United States Patent
Primus et al.

(10) Patent No.: US 10,785,330 B2
(45) Date of Patent: Sep. 22, 2020

(54) DIGITAL EXPERIENCE PROVIDER

(71) Applicant: The Virtual Reality Company, Los Angeles, CA (US)

(72) Inventors: Guy Primus, Los Angeles, CA (US); Kevin Primus, Durham, NC (US); Robert Kohout, Los Angeles, CA (US); Craig McPherson, Northride, CA (US); Philippe Dias, Mission Viejo, CA (US)

(73) Assignee: The Virtual Reality Company, Los Angeles, CA (US)

( * ) Notice: Subject to any disclaimer, the term of this patent is extended or adjusted under 35 U.S.C. 154(b) by 67 days.

(21) Appl. No.: 15/920,329

(22) Filed: Mar. 13, 2018

(65) Prior Publication Data

US 2018/0262583 A1 Sep. 13, 2018

Related U.S. Application Data

(60) Provisional application No. 62/470,610, filed on Mar. 13, 2017.

(51) Int. Cl.
*H04L 29/08* (2006.01)
*H04L 29/06* (2006.01)
*H04W 4/02* (2018.01)

(52) U.S. Cl.
CPC .............. *H04L 67/22* (2013.01); *H04L 67/18* (2013.01); *H04L 67/306* (2013.01); *H04L 67/38* (2013.01); *H04W 4/025* (2013.01)

(58) Field of Classification Search
None
See application file for complete search history.

(56) References Cited

U.S. PATENT DOCUMENTS

2014/0337463 A1* 11/2014 Treu .................. H04L 67/18
709/217
2016/0243440 A1  8/2016 Miura et al.
(Continued)

FOREIGN PATENT DOCUMENTS

WO    2017019530    2/2017
WO    2018170007    9/2018

OTHER PUBLICATIONS

"International Application Serial No. PCT US2018 022249, International Search Report dated May 15, 2018", 2 pgs.
(Continued)

*Primary Examiner* — Davoud A Zand
(74) *Attorney, Agent, or Firm* — Schwegman Lundberg & Woessner, P.A.

(57) ABSTRACT

Various embodiments described herein provide for integration of digital experiences, such as virtual reality and augmented reality experiences experienced on a client device, with activities outside of the digital experience, such as activities outside the virtual world or environment presented by the virtual reality/augmented reality experience. For example, various embodiments enable implementation of a system that integrates a digital narrative experience, being experienced by a participant on their client device, with one or more activities of the participant outside of the digital narrative experience such that the one or more outside activities can influence the narrative experienced by the participant.

21 Claims, 10 Drawing Sheets

(56) References Cited

U.S. PATENT DOCUMENTS

| | | |
|---|---|---|
| 2016/0337506 A1 | 11/2016 | Bjontegard |
| 2017/0061034 A1 | 3/2017 | Ritchey et al. |
| 2018/0255347 A1* | 9/2018 | Kharitonsky ...... H04N 21/4334 |
| 2018/0301222 A1* | 10/2018 | Dew, Sr. ................ G06Q 10/00 |

OTHER PUBLICATIONS

"International Application Serial No. PCT US2018 022249, Written Opinion dated May 15, 2018", 5 pgs.

International Application Serial No. PCTiUS2018/022249, International Preliminary Report on Patentability dated Sep. 26, 2019, 7 pgs.

* cited by examiner

US 10,785,330 B2

DIGITAL EXPERIENCE PROVIDER

RELATED APPLICATIONS

This application claims the benefit of priority under 35 USC 119(e) of U.S. Provisional Patent Application No. 62/470,610 filed on Mar. 13, 2017, the contents of which are incorporated herein by reference in their entirety.

TECHNICAL FIELD

The present disclosure relates generally to digital experiences, and more particularly, various embodiments described herein provide for providing digital experience content (e.g., gaming, augmented or virtual reality experience content) to a participant according to the participant's attributes, such as their collected achievements.

BACKGROUND

Digital experiences have become a prevalent method of informing and entertaining society. These experiences come in variety of forms, such as movies, gaming, augmented reality, and virtual reality, and can be experienced by participants through a variety of apparatuses, including personal computers, smartphones, movie theaters, gaming devices, and virtual reality equipment (e.g., virtual reality headset). Certain digital experiences, such as video games and virtual reality experiences, permit participants to interact with the digital experiences in such a way that the interactions determine what the participants experience.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
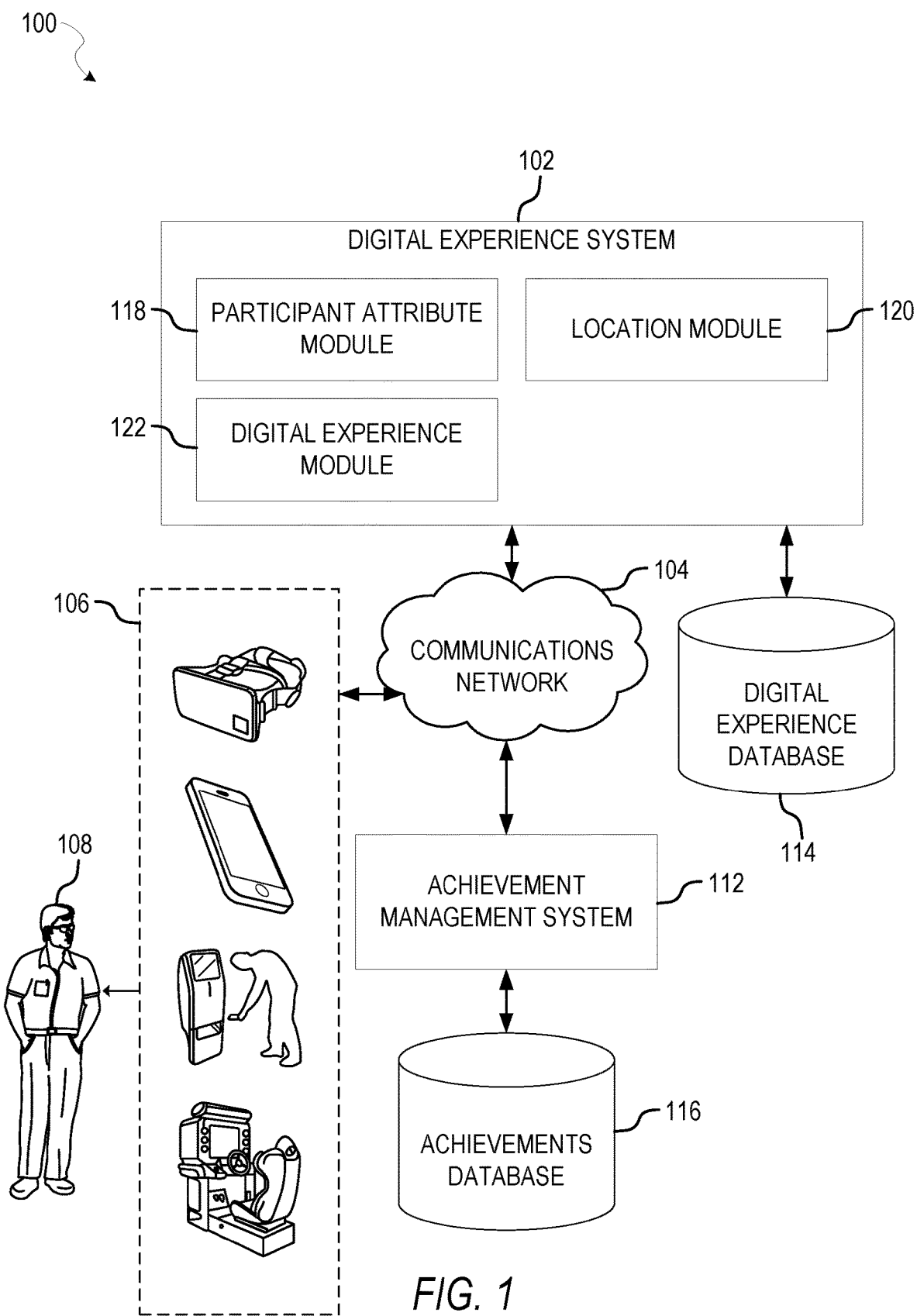
FIG. 1 is a diagram illustrating an example system for providing a digital experience, according to some embodiments.

Various embodiments described herein provide for integration of digital experiences, such as virtual reality and augmented reality experiences experienced on a client device, with activities outside of the digital experience, such as activities outside the virtual world or environment presented by the virtual reality/augmented reality experience. Through such integration, some embodiments deliver to a participant a digital experience that can be customized or personalized based on characteristics of the participant determined within or outside the digital experience. For example, various embodiments enable implementation of a system that integrates a digital narrative experience, being experienced by a participant on their client device (e.g., smartphone), with one or more activities of the participant (e.g., gaming, participation, or purchasing activities) outside of the digital narrative experience such that the one or more outside activities can influence the narrative experienced by the participant. In another example, an embodiment may customize or personalize a digital experience based on a participant's current physical location (e.g., as determined by their client device) or the participant's achievements, such as those collected in another (e.g., related) digital experience, or collected based on the participant's real-world activities (e.g., those recorded by the client device).

Use of various embodiments improve or enable a computer system's ability to deliver to a participant a digital experience that is individually customized or personalized according to the participant's characteristics (e.g., profile), which may be determined by participation within the digital experience or outside the digital experience. Additionally, various embodiments can encourage or incentivize a participant's engagement in one or more outside activities (e.g., in the real-world or in another digital experience) in order for the participant to gain certain access within the digital experience (e.g., gain access to a narrative branch path in a narrative digital experience when you visit a real-world location related to the narrative digital experience). Further, some embodiments facilitate cross platform integration of specific digital experiences (e.g., virtual reality experiences) with activities outside those specific digital experiences (e.g., playing a third-party video game), where delivery of the specific digital experiences is being handled by one system/platform (e.g., operated by one party) and where the outside activities is being processed, managed, or monitored by another system/platform (e.g., operated by a third party).

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As used herein, a "digital experience" can include a video game, a virtual environment (e.g., 3D-rendered virtual world), a virtual reality experience (VRE), a digital story, and the like. A digital experience may be experienced by a participant through a variety of client computing devices (e.g., mobile device or VRE equipment, such as a virtual reality headset), while the user is at home or at a particular destination. The digital experience may be interactive or non-interactive, narrative or non-narrative, purchased or earned, an event (e.g., brand-related event) or ongoing, or single-participant or multi-participant. For example, a narrative digital experience can include an overarching narrative, which a participant may experience within a virtual environment. Such a narrative digital experience can include one or more points within the digital experience where a particular narrative branch path may be selected, from a plurality of narrative branch paths, and then followed, thereby causing a participant to be provided with content of the narrative digital experience associated/in accordance with the selected narrative branch path. According to various embodiments described herein, a narrative branch path of a narrative digital experience may be selected based on one or more attributes (e.g., participant achievements) associated with a participant experiencing (e.g., participating in or interacting with) the narrative digital experience.

As used herein, an "attribute" can comprise at least one value (or attribute value). For various embodiments, an attribute (e.g., of a participant or an object) may be stored in a data structure, such as an array, a database record, or data object.

As used herein, a "participant" can include a user, player (e.g., video game player), or member, who may have an associated profile within a database (e.g., a profile or achievements database) that persists before and after their experience with the digital experience. An authenticated participant can include a participant whose registered identity has been verified through login/password, radio frequency identification (RFID) or other verification method. The authenticated participant may be currently engaged in a digital experience (e.g., a digital narrative experience) such that their actions within the experience can affect, or be affected by, a participant's profile (e.g., from a database), thereby facilitating the personalization of the digital experience.

As used herein, a "narrative branch path" can also be referred to as a narrative branch or branching narrative. Additionally, as used herein, a "participation experience" can include a brand-related event or purchase.

As used herein, an "event" or "hotspot" can signify a particular point (e.g., in time or virtual location) within a digital experience, at which various embodiments described herein may evaluate a current value of at least one attribute of a participant (e.g., participant's achievements, responses, outside participation, proximity to physical locations, etc.). For instance, a current value of a particular participant attribute may be evaluated to determine whether the digital experience should be adjusted, how to adjust the digital experience, or by how much the digital experience should be adjusted based on the current value. An event may correspond to a node of a node map that describes a digital experience.

As used herein, a "node" can represent, without limitation, an achievement, branch path, or choice node disposed at an absolute or relative location within a virtual environment (e.g., 3D rendered environment), which can be activated by a participant's proximity, or the participant's action, to unlock an achievement, open a branch path, or afford a choice to the participant. A particular node may be activated, for example, by a participant's past achievement, the participant's proximity, or the participant's action, which can cause a new achievement to be unlocked, a branch to open, or a choice to be afforded (e.g., within the digital experience) to the participant.

As used herein, a "node map" can include a coded environment or data structure that identifies, for example, nodes, their activation criteria, their associated artificial-intelligence algorithms, their dynamic data arrays, or their reporting protocols.

A digital experience can comprise a set of experience objects. As used herein, an "experience object" of the digital experience can comprise a component of a digital experience that is delivered to, and is sensible by, a participant of the digital experience (e.g., through one of the participant's human sensory organs) as the participant experiences the digital experience. An experience object can include, without limitation, a visual score (e.g., video), an audio score (e.g., musical soundtrack), a haptic score (e.g., relating to vibration, force feedback, temperature, etc.), a virtual environment visual (e.g., background colors or virtual object colors), a virtual environment sound, a narrative branch path, a virtual object in the virtual environment (e.g., virtual world), an achievement, or a perspective (e.g., a camera position within a virtual environment). For instance, an experience object can include an in-experience object (e.g., a virtual object) in a virtual environment that a participant can experience, perceive, or interact with in the virtual environment audibly, tangibly, and visibly. The experience object may be one that can have abilities/skills/effects within the virtual environment, and can have physical properties within the virtual environment (e.g., weight, friction, mass, and destructibility).

Additionally, an experience object of a digital experience may be delivered to a participant by way of the set of devices (e.g., VRE equipment, head-mounted display, mobile device, handheld controller or input device, etc.) the participant uses to experience the digital experience. A given digital experience object may be an optional or alternative experience object of the digital experience. According to various embodiments described herein, an optional or alternative experience object of a digital narrative experience may be expressed or enabled (e.g., made available) based on a participant's profile, achievement data, a narrative branch path selected as a participant experiences the narrative digital experience (e.g., selected as described herein).

As used herein, an "achievement" can include a challenge, a discovery (e.g., discoverable object), a desired object, a goal, or the like, which may be completed, obtained, collected, or attained within a digital experience (e.g., by game play in a video game) or in a real-world environment (e.g., by visiting a real-world location). A database (e.g., an achievements database) or another type of data store may be used to save data relating to a set of achievements earned by a particular user/participant. A participant collecting an achievement can include earning or unlocking the achievement. Unlocking a narrative branch path can involve, at least in part, presenting a requisite set of achievements at a pre-defined location and time within a digital experience to make an exclusive narrative branch path available to the authenticated participant to experience.

For some embodiments, a centralized achievement management tool is configured to interface with and integrate into one or more digital experiences, such as narrative experiences, and video games (e.g., computer, console, or mobile games). The achievements of an authenticated participant (also referred to as a "user") may be accomplished in one digital experience (e.g., video game) and then added to an achievement database that records that the participant has secured that achievement. In a subsequent (possibly related or companion) narrative experience (e.g., virtual reality experience), the tool may check for the level of achievement at a given decision point (fork point) and provide the participant with the appropriate set of narrative branch paths based on that level of achievement. According to an aspect of some embodiments, multiple achievements and decision points can be combined with other participant-specific information, such as demographic, kinetographic, or physical location data, to provide participants a narrative experience tailored to the participant.

According to some embodiments, the cross-platform achievement management tool is implemented as a system. The system has an achievement database, which may accept, organize, retrieve, access, query, report, and return real-time information from an array of narrative experiences for a participant. The system has a database for storing data relating to audio, visual, and haptic stimuli associated with player achievements. The stimuli may signal a participant that a certain achievement is proximate to them within the digital experience. The system includes a dynamic, coded process that evaluates combinations of achievements and unlocks various narrative branch paths, or exclusive opportunities in other connected, companion narrative experiences. The system includes a server to provide access to participant achievement data to facilitate real-time narrative branch path personalization within single-participant or multi-participant digital experience.

Types of opportunities made available to the participant within a digital experience, such as choices, narrative branch paths, and achievements, may be determined based on achievements recorded for one or more participants. In particular, choices made by a participant at decision points, and the real-time opportunity structure algorithm may be calculated by the system in response to choices made by other participants in current and previous narrative experiences.

Types of narrative branch paths available to a participant for a given digital narrative experience may be based on previous achievements in previous sessions (e.g., previous game plays) of the current digital narrative experience, as well as achievements that may have been earned in companion digital narrative experiences (e.g., game play in other video games).

Types and number of achievements earned by one or more participants on a particular digital narrative experience may be combined with achievements earned in other digital narrative experiences to determine which achievements (e.g., in a separate, companion digital narrative experience) may be switched on or off based on a particular combination of achievements by one or more participants in the current narrative experience.

For some embodiments, one or more achievement-proximity signals (e.g., audio, visual, or haptic) accompany one or more of achievement interactions. The achievement interactions can include including, but are not limited to: approach object; spy object; attract object; collect object; possess object; activate object; lose object; deliver object; access bonus material; post to social media; solve riddle; solve puzzle; complete challenge; build virtual structure; complete learning exercise; attend party; meet sage; upload photo; attend virtual event; attend live event; sign in at convention; visit location; initiate conversation; inquire about a topic; deliver information; meet character; fight character; perform maneuver; defeat character; join forces; spare a life; perform act of service; part ways; assemble team; earn credential; deplete resource; restore access; access memory; access skill; overburden self; rest; replenish resource; and repair relationship.

The system may reward the participant for earning achievements in a digital narrative experience based on earning (or purchasing) an achievement within an accessible narrative branch path within the current narrative experience, some of which may be only made available by earning (or purchasing) an achievement (e.g., accomplishment) within another companion narrative experience.

Types of opportunities afforded by the one or more dynamic nodes to the participant (e.g., within a branch of the opportunity structure in proximity to the one or more dynamic nodes) may be determined based on interactions between the one or more dynamic nodes and the participant within the narrative experience engaged in by the participant.

Types of opportunities afforded by the one or more dynamic nodes and the participant (e.g., within the dynamic node map in proximity to one or more dynamic nodes) may be coded to activate based on real-time data from an achievement database. As noted herein, the achievement database may indicate earned (or procured) achievements of participants and achievement-activating behaviors performed by participants and their interactions with dynamic nodes within the narrative-experience engaged in by the participant.

The perception of clarity, intensity or volume of audio, visual or haptic signals from one or more dynamic nodes and the participant within the dynamic node map generated by one or more dynamic nodes may be determined based on interactions among one or more dynamic nodes and the participant within the narrative experience engaged in by the participant.

A demographic, psychographic and kinetographic profile with location data of the participant may persistent across a plurality of different narrative experiences and titles.

According to some embodiments, a method of integrating one or more achievements recorded on a database (e.g., achievement database) into one or more digital experiences, comprises executing one or more computer software modules on a digital experience platform to generate, for a participant, visual, audio and haptic stimuli associated with a digital experience. The method may comprise implementing artificial intelligence within the digital experience platform to activate one or more dynamic nodes to interact with the participant in the digital experience. The method may comprise executing one or more database inquiries on a server remote from the digital experience platform to provide an achievement opportunity to the participant and a plurality of other participants, wherein the achievement database may be operated in separate virtual computing environment from the digital experience. The method may also comprise providing the one or more dynamic nodes access to the participant profile in the achievement database. As used herein, a "participant profile" may include one or more of a participant purchase, a user RFID activation, a theatrical performance, a user login, a user geolocation check-in, delivery of a virtual resource, an activation of a promotional code, a multi-player experience invitation, an acceptance of a multi-player experience invitation, purchase of a consumer good, or a specified participant action within the digital experience.

A centralized achievement management tool interfaces and integrates into one or more narrative experiences with multiple branch paths. The achievement management tool drives progression of the digital narrative experience and interaction with the narrative (or story) and the virtual environment produced by the digital narrative experience. According to some embodiments, multiple treatments and decision points are combined with other user specific information, including demographic and location data for example, to give participants and even more customized digital narrative experience.

For example, a participant in a digital narrative experience may have his or her narrative determined by the achievements earned in a mobile experience (e.g., earning a high score, discovering a hidden object, or defeating a real or virtual opponent), which may determine the availability of one or more narrative branch paths that the participant can traverse as they experience the narrative. For instance, if a participant finds a golden key in a mobile video game, he or she will be notified of this achievement and the key will be added to a list of achievements that will be stored in a centralized database and accessible via any interactive device that is connected to the user's account. In future episodes of a companion narrative experience, the user will encounter a door that is locked and can only be opened with the golden key that is available and discovered only in the mobile experience. If the participant has earned the golden key achievement, he or she will be able to unlock the door that will lead to a unique/exclusive narrative experience. If he or she does not have the golden key achievement, he or she will not be able to unlock the door and will follow a different narrative branch path.

The availability for a participant to unlock certain achievements may be based on the participant's past performance and the existing achievements (e.g., as recorded in the achievements database). Additionally, the availability to unlock certain achievements may be based on the consumable nature of achievements relative to other participants in the narrative experience. For example, an achievement may be limited to one or many participants, and after those achievements have been collected by a predefined number of participants, that achievement would not be available to any future participants who would have otherwise unlocked that particular achievement and added it to his or her database.

With respect to a digital narrative experience, a narrative branch path may be created to provide enhanced narrative experiences to participants who engage in a desired or incentivized behavior (e.g., in or outside the digital experience). The achievements that permit access to a particular narrative branch path in a digital narrative experience may have been earned, such as: in a previous event; in the current digital narrative experience; in a companion digital narrative experience; in a video game (e.g., computer, console, or mobile game); by purchase of virtual goods; by purchase of real goods/branded merchandise; or by other interactive means. The achievements that permit access to a particular narrative branch path in a digital narrative experience may be earned by visiting a particular location (e.g., with a GPS-enabled devices or RFID check-in), which activates and adds the achievement to the participants achievement database, Multiple achievements may also be combined to unlock any particular narrative branch path in a digital narrative experience, and the combination of a certain set of achievements may determine which narrative branch path a participant takes. For example, a user may be required to find multiple items which in combination, make a larger item. Each individual item may be an achievement individually, but the collective set of achievements unlock a larger achievement. Each of these individual achievements may be accessible and achievable on a single platform, or may be distributed among a variety of individual and mutually exclusive platforms, devices, or locations.

Certain achievements may be accessible only by way of a narrative branch path that has been earned through collection of another achievement. In this way, each participant would need to unlock one achievement before embarking down a narrative branch path. Once in this narrative branch path, a participant may encounter another achievement (e.g., challenge) that would allow him or her to unlock an additional achievement or may enable access to yet another narrative branch path, video game, or access to an exclusive real-world event (e.g., backstage pass) or a real world geographic location (e.g., airport ambassador's club).

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example system 100 for providing a digital experience, according to some embodiments. As shown, the system 100 comprises a digital experience system 102, a communications network 104, a set of client systems 106, an achievement management system 112, a digital experience database 114 coupled to the digital experience system 102, and an achievements database 116 coupled to the achievement management system 112. The communications network 104 communicatively couples the digital experience system 102, the set of client systems 106, and the achievement management system 112 together. The digital experience system 102 comprises a participant attribute module 118, a location module 120, a digital experience module 122, and an achievement data module 124. An end-user of one of the client systems 106 represents a participant 108 of a digital experience provided in accordance with various embodiments described herein. For various embodiments, the components and arrangement of components may vary from what is illustrated in FIG. 1.

As used herein, a module, engine, or component can comprise a unit of functionality that can be performed in accordance with one or more embodiments described herein. A module, engine, or component might be implemented utilizing any form of hardware, software, or a combination thereof. Accordingly, a module, engine, or component can include a program, a sub-routine, a portion of a software application, or a software component or a hardware component capable of performing one or more stated tasks or functions. For instance, one or more hardware processors, controllers, circuits (e.g., ASICs, PLAs, PALs, CPLDs, FPGAs), logical components, software routines or other mechanisms might be implemented to make up a module, engine, or component. In implementation, the various modules/engines/components described herein might be implemented as discrete elements or the functions and features described can be shared in part, or in total, among one or more elements. Accordingly, various features and functionality described herein may be implemented in any software application and can be implemented in one or more separate or shared modules/engines/components in various combinations and permutations. Even though various features or elements of functionality may be individually described or claimed as separate modules, for some embodiments, these features and functionality can be shared among one or more common software and hardware elements. The description provided herein shall not require or imply that separate hardware or software components are used to implement such features or functionality.

The digital experience system 102 provides a digital experience, which may be retrieved from the digital experience database 114, to the set of client systems 106. With the digital experience, the digital experience system 102 can provide an experience object of the digital experience, such as an experience object comprising a narrative branch path, a score (e.g., haptic, audio, visual, perspective, etc.), a character option, or an achievement, which may be sensible by the participant 108 (e.g., by their human sense of sight, touch, hearing, smell, or taste). The digital experience system 102 can deliver the digital experience to the participant 108 at one of the client systems 106 over the communications network 104.

The achievement management system 112 manages an achievement associated with a participant, and may further manage a profile of the participant. According to some embodiments, an achievement of a participant (e.g., authenticated participant) is to be accomplished in a digital experience (e.g., one which may or may not be provided by the digital experience system 102) and then added to the achievements database 116, which records that the participant has secured that achievement. The achievement management system 112 can provide the participant attribute module 118 (of the digital experience system 102) with the participant's achievement data (e.g., level of earned achievement) for a given digital experience (e.g., a digital experience that is subsequent or companion to the digital experience in which the achievement was earned). Such achievement data may be provided to the participant attribute module 118 with respect to a given hotspot or event (e.g., decision point) of the given digital experience. A participant profile can provide participant-specific information, such as demographic, kinetographic, and location data. A participant's profile, achievement data, or both can be used in delivering a tailored digital experience (via the experience object of a digital experience delivered to the participant) to a participant.

The participant attribute module 118 provides or accesses a set of attributes for a participant (e.g., authenticated participant), which may be accessed from participant-related data, such as a participant profile maintained on a database. As noted herein, the set of attributes for the participant be used by the digital experience module 122 when determining one or more attributes of an experience object in a digital experience provided (e.g., presented or delivered) to the participant by the digital experience module 122. The participant attribute module 118 may include an achievement data module (not shown), which may enable the participant attribute module 118 to access achievement data associated with the participant 108. As noted herein, the achievement data accessed by the participant attribute module 118 may be used by the digital experience module 122 when determining one or more attributes of an experience object in a digital experience provided (e.g., presented or delivered) to the participant by the digital experience module 122.

Depending on the embodiment, the participant attribute may comprise a participant collected achievement. The participant collected achievement may comprise an achievement collected by the participant while experiencing (e.g., participating in or interacting with) the digital experience provided by the client device based on the digital experience content data (e.g., provided by the digital experience module 122). The participant collected achievement may comprise an achievement collected by the participant while experiencing another (e.g., companion) digital experience based on other digital experience content data (e.g., provided by the digital experience module 122). The participant collected achievement comprises an achievement collected based on data that indicates that the participant performed an activity in a real-world environment (e.g., visit a movie theater to watch a newly released film). For example, the activity comprises the participant purchasing a real-world item or service (e.g., through the client system 106), or the participant visiting a real-world location.

The location module 120 provides or determines a physical location of a client device associated with a participant. Depending on the embodiment, the physical location may comprise a geographic position of the client device, or the name of the real-world place at which the client device is located. For example, the physical location may comprise geographic coordinates corresponding to the client devices current location on the planet Earth. In another example, the physical location may comprise a name of a place at which the client device is located, such as the brand name of a business at which the client device is located (e.g., STARBUCKS, MCDONALDS, WALMART, etc.), a name of a famous location (e.g., EIFFEL TOWER), or type of place (e.g., library, restaurant, shopping mall, movie theater, etc.).

The digital experience module 122 provides digital experience content data, associated with one or more digital experiences, to a client device associated with a participant. For some embodiments, the digital experience content data enables a client device to provide a participant with a digital experience based on the digital experience content data. The digital experience module 122 may access digital experience content data from the digital experience database 114, which may maintain content data for a plurality of digital experiences (e.g., companion digital experiences).

As noted herein, the digital experience may comprise a set of experience objects that a participant can experience through the digital experience. According to some embodiments, an object attribute of at least one experience object, in the set of experience objects, is determined by the digital experience module 122 based on a physical location of the client device, a participant attribute from the set of participant attributes, or both. An object attribute of an experience object may be determined based on whether a threshold, associated with the object attribute, has at least been met by at least one of the physical location of the client device or the participant attribute from the set of participant attributes. For some embodiments, when a participant in a digital experience interacts or attempts to interact (e.g., performs an action) with an experience object, one or more attributes of the experience object are checked (e.g., compared) against one or more attributes of the participant to determine whether the interaction with the experience object can take place or how the interaction with the experience object will take place.

The set of experience objects may comprise at least one of a narrative branch path, a virtual object, a musical score, an achievement, or a virtual environment sound. According to some embodiments, the digital experience comprises a digital narrative experience and the set of experience objects comprises at least one narrative branch path.

Additionally, for some embodiments, the digital experience comprises a set of hotspots at which at least one attribute of an experience object (e.g., one proximate to the hotspot within the digital experience) is determined. For example, when a participant is proximate to a hotspot, an experience object associated with the hotspot may have a set of its attributes determined. An attribute of an experience object may be determined in response to an associated hotspot being activated by a participant. Additionally, a given hotspot may be activated based on, for instance, a participant's proximity to the hotspot (which can include the participant reaching the hotspot), or a participant's action or interaction within the digital experience (e.g., with another experience object).

Figure 2:
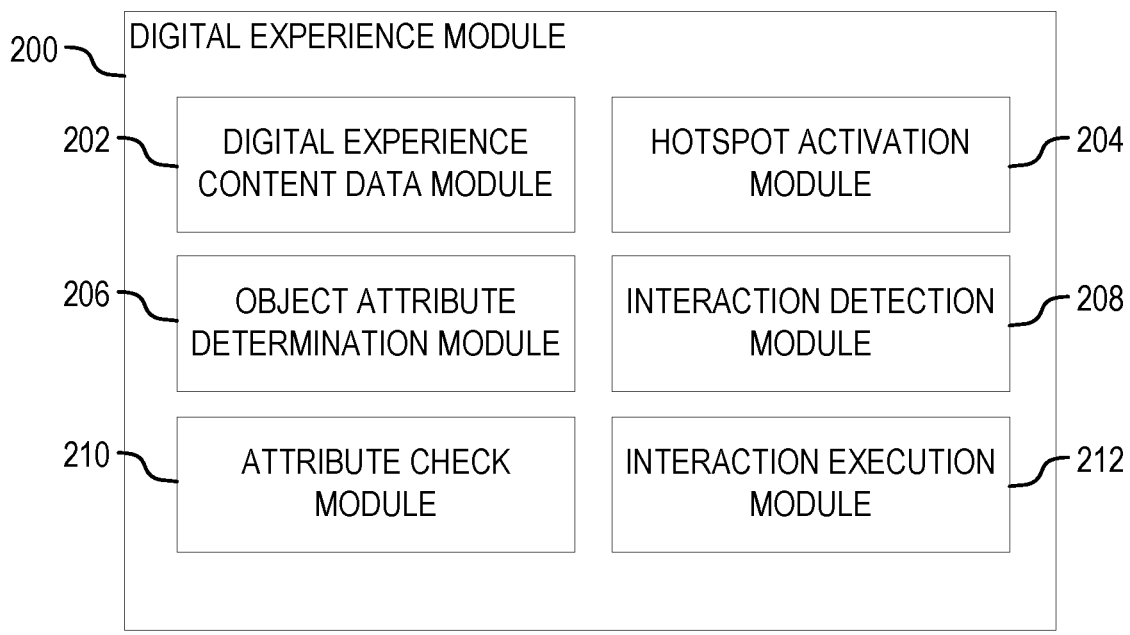
FIG. 2 is a diagram illustrating an example digital experience module, in accordance with some embodiments.

FIG. 2 is a diagram illustrating an example digital experience module 200, in accordance with some embodiments. As shown, the digital experience module 200 comprises a digital experience content data module 202, a hotspot activation module 204, an object attribute determination module 206, an interaction detection module 208, an attribute check module 210, and an interaction execution module 212. According to some embodiments, the digital experience module 122 described with respect to FIG. 1 includes one or more modules of the digital experience module 200 describes with respect to FIG. 2.

The digital experience content data module 202 accesses digital experience content data (e.g., from the digital experience database 114) to provide the digital experience content data to a client device associated with a participant.

The hotspot activation module 204 determines whether a participant has activated a hotspot within a digital experience, such as based on the participant's proximity to the hotspot. For example, the participant may activate a given hotspot, located within a virtual environment or world presented by the digital experience, by reaching or nearing the given hotspot. Alternatively or additionally, the given hotspot may be timeline related and the given hotspot may be activated by the participant reaching or nearing the time on the timeline associated with the given hotspot.

The object attribute determination module 206 determines a set of object attributes, for an experience object, based on at least one participant attribute of a participant. According to some embodiments, an object attribute of an experience object may be determined by the object attribute determination module 206 in response to the hotspot activation module 204 detecting activation of a hotspot associated with the experience object.

The interaction detection module 208 detects an interaction by a participant with an experience object. For instance, the object attribute determination module 206 may detect an action the participant performing (or attempting to perform) with respect to the experience object within the digital experience.

The attribute check module 210 checks an object attribute of an experience object against a participant attribute associated with a participant (e.g., one relevant to the experience object). For instance, the object attribute of the experience object may be checked against the participant attribute, of the participant, in response to the interaction detection module 208 detecting an interaction with the experience object by the participant.

The interaction execution module 212 executes an interaction, detected by the interaction detection module 208, on an experience object based on checking an object attribute against a participant attribute by the attribute check module 210. For example, the interaction execution module 212 can execute an action on an experience object by a participant by determining whether a participant attribute of the participant meets or exceeds an object attribute of the experience object, such as an object attribute (e.g., friction, weight, mass, etc.) that determines how the action is performed on the experience object.

Figure 3:
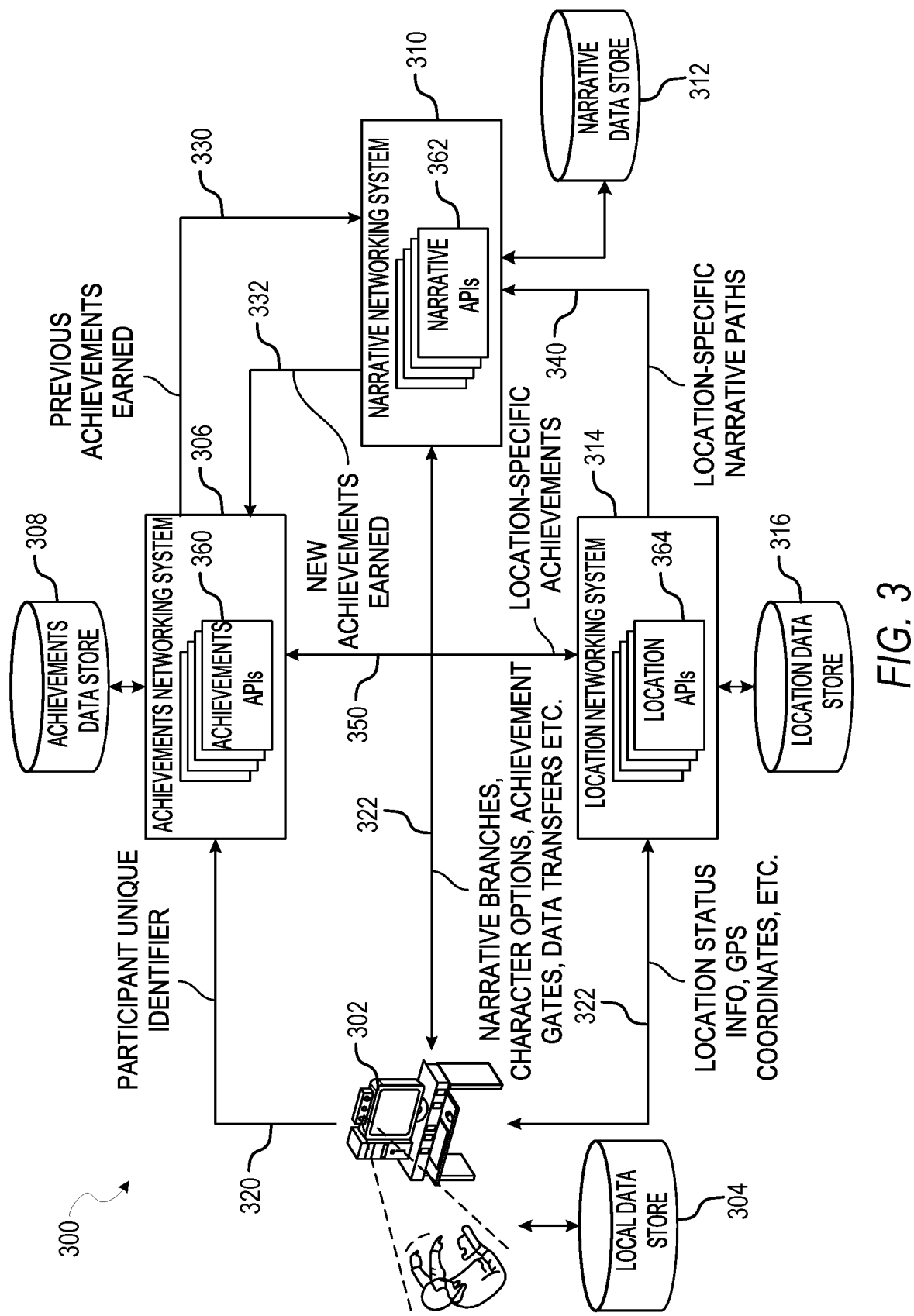
FIG. 3 is a diagram illustrating example systems for providing a digital experience, in accordance with some embodiments.

FIG. 3 is a diagram illustrating example systems 300 for providing a digital experience, in accordance with some embodiments. As shown, the systems 300 comprise a client device 302, a local data store 304 coupled to the client device 302, an achievements networking system 306, an achievements data store 308 coupled to the achievements networking system 306, a narrative networking system 310, a narrative data store 312 coupled to the narrative networking system 310, a location networking system 314, and a location data store 316 coupled to the location networking system 314. A communications network (not shown) may be communicatively coupled together various components illustrated in FIG. 3. Additionally, each of the achievements networking system 306, the narrative networking system 310, and the location networking system 314 comprises one or more application program interfaces 360, 362, 364, which can facilitate data interactions between two or more of the systems 306, 310, 314. For some embodiments, the narrative networking system 306 may comprise the digital experience system 102 described with respect to FIG. 1.

According to some embodiments, through the client device 302, a participant may experience (e.g., participate or interact with) a digital experience based on digital experience content data provided to the client device 302. The client device 302 may host a client application that enables a participant to experience the digital experience at the client device 302 based on the digital experience content data, which may be provided as data 322 by the narrative networking system 310. As shown, the data 322 can include narrative branches, character options, achievement gates (e.g., that enable a participant to achieve certain achievements), one or more hotspots of a digital experience, and other experience objects. The data 322 can include interactions (e.g., actions) performed by the participant within the digital experience, which can be transmitted to the narrative networking system 310. The local data store 304 may store data that facilitates one or more operations in connection with a digital experience being provided to a participant at the client device 302. The local data store 304 may store, for example, data 322 received from the narrative networking system 310.

As illustrated by FIG. 3, during operation the client device 302 may provide data 320 including a participant unique identifier to the achievements networking system 306, which can enable the achievements networking system 306 to provide identify and provide achievement data from the achievements data store 308 (e.g., comprising a database) associated with the participant. For some embodiments, the achievements networking system 306 provides participant-related data from the achievements data store 308 based on the participant unique identifier. As shown, the achievements networking system 306 can provide data 330 relating to previous achievements earned by the participant to the narrative networking system 310. Additionally, as a participant experiences (e.g., participants or interact within) a digital narrative experience, data 332 relating to any new achievements earned by the participant.

Additionally, during operation, the client device 302 may provide the location networking system 314 with data 322 relating to a location information associated with the client device 302, which can include location status information, geographic position system (GPS) coordinates, and the like for the client device 302. Based on the data 322, the location networking system 314 can provide location-specific data (from the location data storage 316) to the achievements networking system 306, the narrative networking system 310, or both. For example, as shown, the location networking system 314 can provide data 350 relating to one or more location-specific achievements, which may be earned (e.g., granted) by a participant based on a location of the client device 302. In another example, the location networking system 314 can provide data 340 relating to one or more location-specific specific narrative paths, which may be made available to a participant for selection (and traversal) based on a location of the client device 302.

During operation, the narrative networking system 310 provides digital experience content data (e.g., digital narrative experience content data) to the client device 302, and may receive interaction data from the client device 302 as a participant experiences a digital experience through the client device 302.

Figure 4:
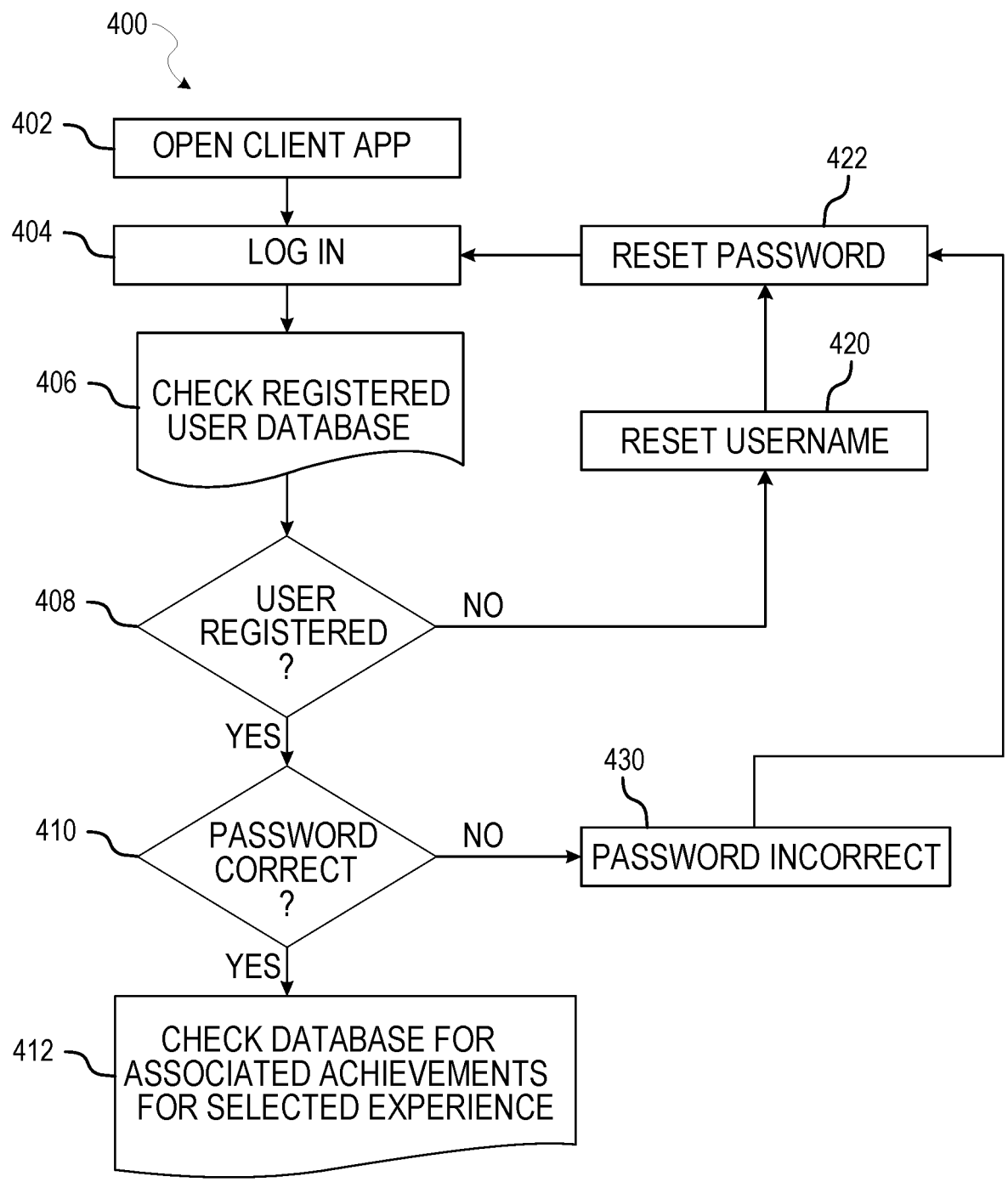
FIG. 4 is a flowchart illustrating an example method for authenticating a participant and obtaining participant attributes for a selected digital narrative experience, in accordance with some embodiments.

FIG. 4 is a flowchart illustrating an example method 400 for authenticating a participant and obtaining participant attributes (e.g., collected achievements) for a selected digital narrative experience, in accordance with some embodiments. An operation of the method 400 may be performed by a hardware processor (e.g., central processing unit or graphics processing unit) of a computing device, such as desktop, laptop, server, or the like. For some embodiments, operations of the method 400 may be performed by the digital experience system 102 described with respect to FIG. 1, the achievement management system 112 described with respect to FIG. 1, the achievements networking system 306 described with respect to FIG. 3, or the narrative networking system 310 described with respect to FIG. 3. Though the operations of method 400 may be depicted and described in a certain order, the order in which the operations are performed may vary between embodiments. For instance, an operation may be performed before, after, or concurrently with another operation. Additionally, the modules described above with respect to the method 400 are merely examples of modules that may be used with the method 400, and that other components may also be utilized in some embodiments.

As shown, the method 400 begins with operation 402, where a client application is opened at a client device (e.g., the client system 106), which can then interact with a digital experience system (e.g., 102). The method 400 continues with operation 404, where a participant logs in with a participant unique identifier. The method 400 continues with operation 406, where the participant unique identifier is checked on a registered user database. The method 400 continues with operation 408, the participant is determined whether he or she is a registered user based on the registered user database. If the participant is not a registered user, the method 400 continues to operations 420, where a username is reset or created, and the method 400 continues to operation 422, where a password associated with the username is reset or created. The method 400 would then continue return to operation 404, to permit the participant another chance to log in.

If the participant is a registered user, the method 400 continues to operations 410, where it is determined whether a password provided by the participant is correct. If the password is not correct, the method 400 continues with operation 430, where participant is notified, and the method 400 continues with operation 422, where the password associated with the user name can be reset.

If the password is not correct, the method 400 continues with operation 412, where a database (e.g., an achievement database) is checked for one or more achievements associated with a digital experience selected for experience by the participant.

Figure 5A:
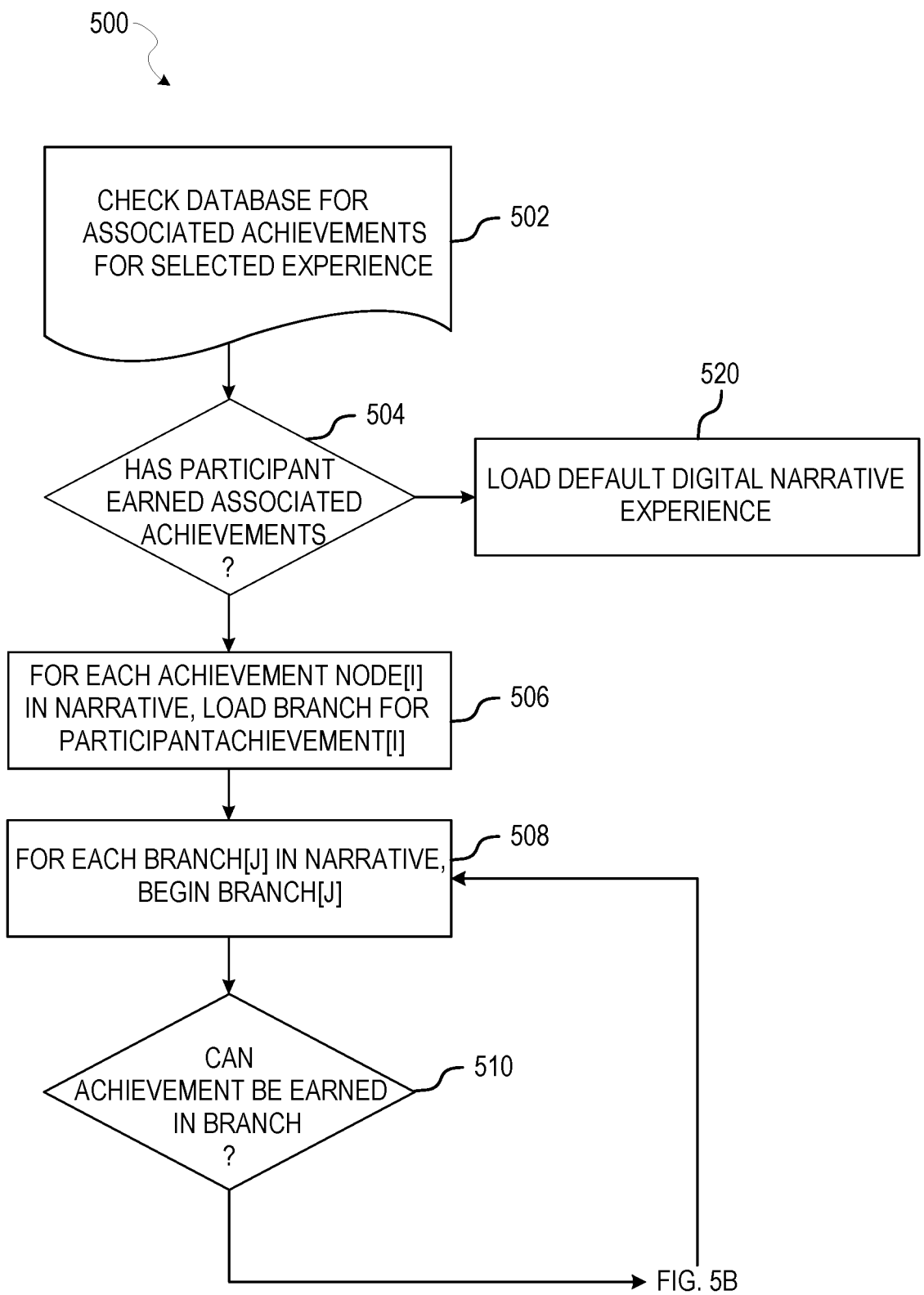
FIGS. 5A and 5B are flowcharts illustrating an example method for loading a selected digital narrative experience and its narrative branch paths based on a participant attribute, in accordance with some embodiments.
Figure 5B:
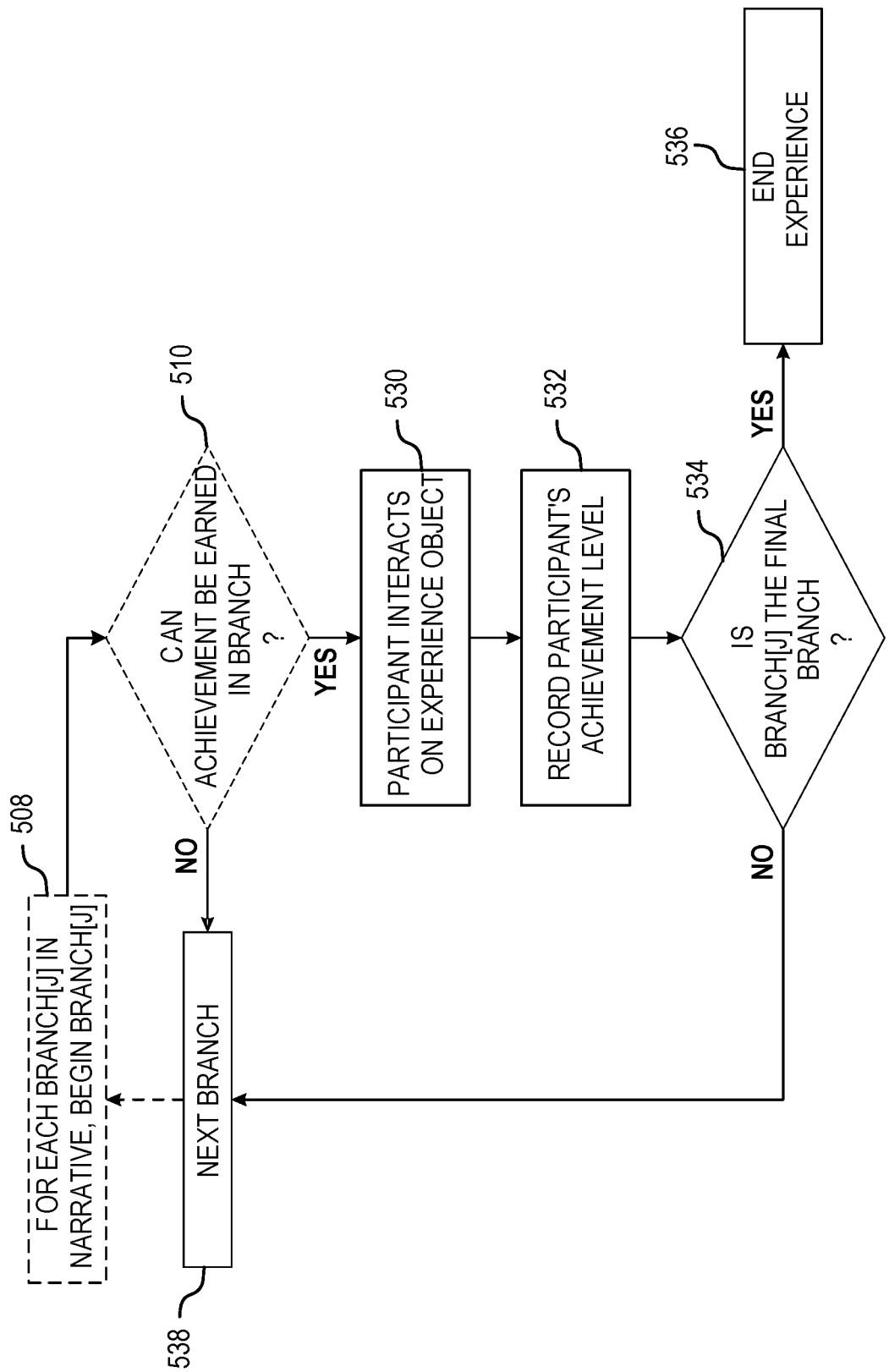

FIGS. 5A and 5B are flowcharts illustrating an example method 500 for loading a selected digital narrative experience and its narrative branch paths based on a participant attribute (e.g., collected achievement), in accordance with some embodiments. An operation of the method 500 may be performed by a hardware processor (e.g., central processing unit or graphics processing unit) of a computing device, such as desktop, laptop, server, or the like. For some embodiments, operations of the method 500 may be performed by the digital experience system 102 described with respect to FIG. 1, or the narrative networking system 310 described with respect to FIG. 3. Though the operations of method 500 may be depicted and described in a certain order, the order in which the operations are performed may vary between embodiments. For instance, an operation may be performed before, after, or concurrently with another operation. Additionally, the modules described above with respect to the method 500 are merely examples of modules that may be used with the method 500, and that other components may also be utilized in some embodiments.

As shown in FIG. 5A, the method 500 begins with operation 502, where a database (e.g., an achievement database) is checked for one or more achievements associated with a selected digital experience. The method 500 continues with operation 504, where it is determined whether a participant (e.g., authenticated participant) has earned one or more of the achievements associated with the selection digital experience. If the participant has not earned any of the associated achievements, the method 500 continues with operation 520, where a default digital narrative experience is provided for loading by a client device of the participant.

If the participant has earned at least one of the associated achievements, the method 500 continues with operation 506, where for each node (in a node map describing the digital narrative experience) associated with an achievement earned by the participant, a narrative branch path associated with the node is provided for loading by the client device of the participant. The method 500 continues with operation 508, where for each narrative branch path provided for loading, the narrative branch path is initiated or launched at the client device. The method 500 continues with operation 510, where it is determined whether one or more achievements can be earned through a current narrative branch path.

As shown in FIG. 5B, from operation 510, if it determined that at least one achievement can be earned through the current narrative branch path, the method 500 continues with operation 530, where the participant interacts on an experience object (e.g., interactive element) of the digital experience, and operation 532, where the participant's achievement level based on the engagement is recorded. In particular, at operation 532, it can be determined whether based on the participant's interaction on the experience object, the participant has achieved one or more of the achievements that can be earned through the current narrative branch path.

From operation 532, the method 500 continues with operation 534, where it is determined whether the final narrative branch path has been reached. If the final narrative branch path has been reached, the method 500 continues with operation 536, where the digital experience ends. If the final narrative branch path has not been reached, the method 500 continues with operation 538, where the next narrative branch path is initiated or launched, and the method 500 continues with operation 508.

Figure 6:
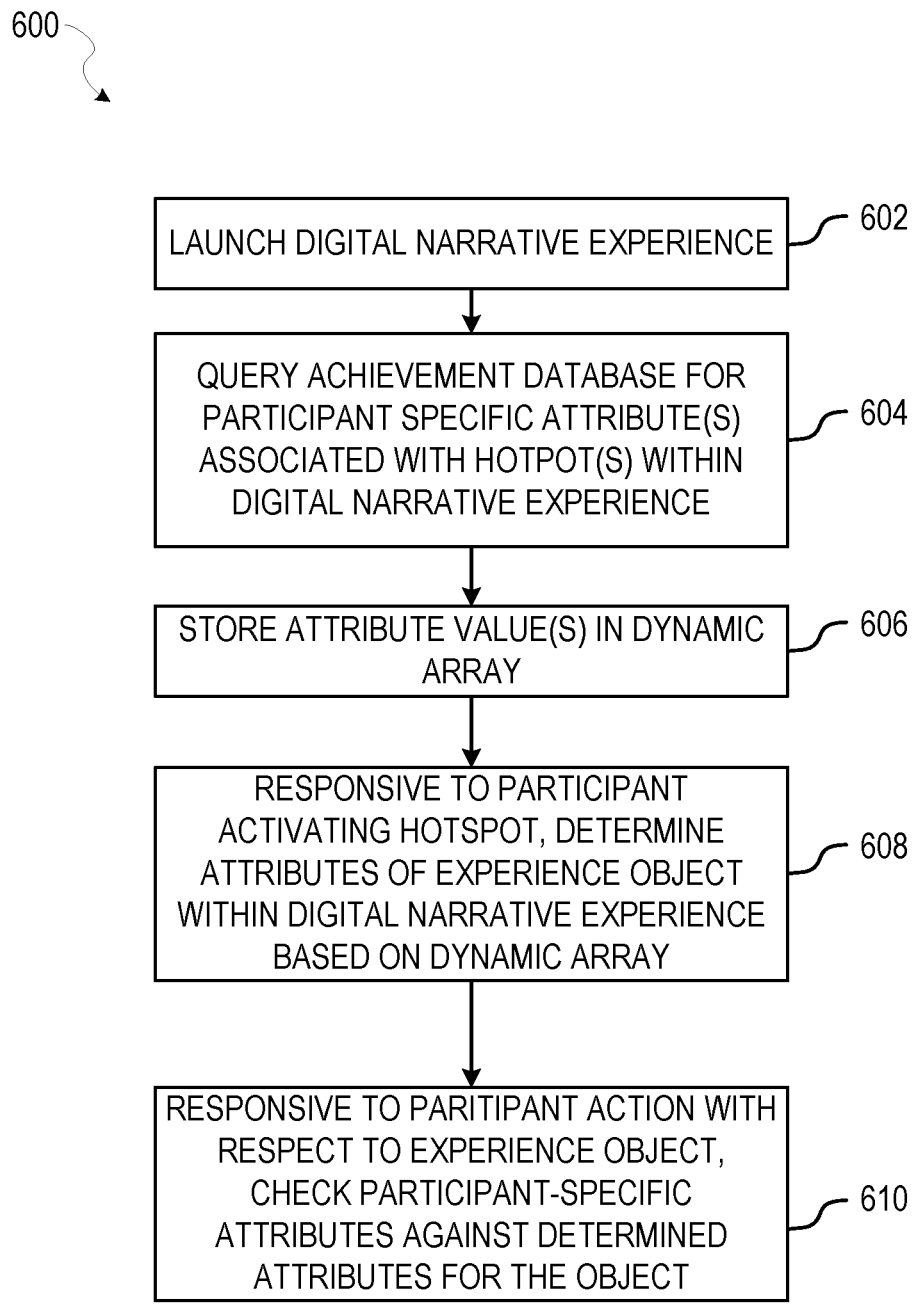
FIG. 6 is a flowchart illustrating an example method for adapting experience objects within a digital experience, in accordance with some embodiments.

FIG. 6 is a flowchart illustrating an example method 600 for adapting experience objects within a digital experience, in accordance with some embodiments. An operation of the method 600 may be performed by a hardware processor (e.g., central processing unit or graphics processing unit) of a computing device, such as desktop, laptop, server, or the like. For some embodiments, operations of the method 600 may be performed by the digital experience system 102 described with respect to FIG. 1. Though the operations of method 600 may be depicted and described in a certain order, the order in which the operations are performed may vary between embodiments. For instance, an operation may be performed before, after, or concurrently with another operation. Additionally, the modules described above with respect to the method 600 are merely examples of modules that may be used with the method 600, and that other components may also be utilized in some embodiments.

As shown, the method 600 begins with operation 602, where a digital narrative experience is launched (e.g., by the digital experience module 122/200). The method 600 continues with operation 604, where an achievement database is queried (e.g., by the participant attribute module 118) for one or more participant-specific attributes (PSAs) associated with one or more hotspots (or events) in the digital narrative experience. The result of the query may comprise a set of attributes values corresponding to the one or more PSAs. The method 600 continues with operation 606, where attribute values of the one or more PSAs are stored (e.g., by the participant attribute module 118) in an array, such as dynamic array, which can relate together one or more participants, participant attributes, achievements (e.g., participant collected and those available for collection), experience objects (e.g., within the digital narrative experience), and object attributes.

In response to a participant activating (e.g., by reaching or coming in near to) a hotspot or event within the launched digital narrative experience, the method 600 continues with operation 608, where one or more attributes of an experience object (e.g., one proximate to the participant within the virtual environment of the digital narrative experience) are determined (e.g., by the digital experience module 122/200). For instance, the dynamic array can be checked for one or more values (e.g., values from the PSA) associated with the hotspot, and these one or more values can be used to determine the one or more attributes of the object. As part of this process, for some embodiment, each relevant value (e.g., associated with the hotspot) found in the dynamic array is inputted into an algorithm (e.g., artificial intelligence algorithm) to determine an attribute of the experience object relating to a threshold value. For example, a threshold value provided by an attribute of an experience object may determine whether the experience object can be (1) perceived or (2) achieved within the launched digital narrative experience by the participant. In such an example, the experience object may be one that is proximate to the participant within the digital narrative experience, and one that comprises a collectable achievement. In this way, one or more attributes of experience objects proximate to a participant are determined (e.g., set) accordingly for the participant.

For some embodiments, the dynamic array stores attribute values for one or more of the following attributes for a particular object (e.g., experience object within the digital narrative experience):

$O_A$=Object Audibility {0 to 200} 100=absolute threshold of hearing; 200=maximum enhanced audibility;

$O_T$=Object Tangibility {0 to 200} 0=intangible; 100=normal tangibility; 200=maximum enhanced tangibility;

$O_V$=Object Visibility {0 to 200}. 0=invisible; 100=normal visibility; 200=maximum enhanced visibility;

$O_R$=Object Resistance {0 to 200}. 0=immovable; 100=normal weight; 200=no resistance;

$O_E$=Object Effectiveness {0 to 200}. 0=ineffective; 100=normal effectiveness; 200=maximum effectiveness; and $O_D$=Object Destructibility {0 to 200}. 0=indestructible; 100=normal destructibility; 200=fully destructible.

In the foregoing, one or more of the visibility, audibility, tangibility, destructibility, effectiveness, and resistance attributes may be pre-defined for each object for a specific digital narrative experience.

Accordingly, at operation 608, the method 600 can customize or personalize the visibility, audibility, and tangibility of each object for each participant according to the aforementioned algorithm using inputs from dynamic array resulting from operation 606. Additionally, the method 600 may recursively traverse all conditions for each hotspot or event (e.g., using else-if statements to complete review of a full array of conditions for each hotspot).

In response to detecting that a participant is performing (or is attempting to perform) an action with respect to the experience object within the launched digital experience, the method 600 continues with operation 610, where at least one participant attribute from the set of PSAs is checked (e.g., by the digital experience module 122/200) against at least one of the one or more attributes determined for the experience object by operation 608. The at least one participant attribute may comprise one that is relevant to the experience object. If a participant attempts a complex action with respect to the experience object, the method 600 may use an algorithm to set thresholds by which the action can be accomplished.

At the conclusion of a digital experience, all final attribute values stored in the dynamic array may be uploaded back to an achievement database (e.g., update achievement collected by the participant).

The following illustrates an example context in which the method 600 can be used. Implementation of the method 600 can differ between contexts. In this example context, the digital narrative experience comprises a video game where the participant is controlling and represented by three players in a virtual world (or alternatively, three participants in a multi-player digital experience, each controlling a different player in the virtual world) Player 1; Player 2, and Player 3. For this example context, Player 1 is a Rogue, Player 2 is an Alchemist, and Player 3 is a Whisperer, and they enter a virtual room within the virtual world that contains five experience objects (e.g., achievements) denoted as follows: {A, B, C, D, E}. The virtual room can represent a hotspot or event for the method 600. The experience objects may be defined as follows:

A=25 HP Quietly Sleeping, Magic Animal;

B=Trap Door leading to a Branching narrative (e.g., another room containing the D, described below);

C=Magic, sleep-inducing musical instrument;

D=Most desired object (e.g., magical sword); and

E=Major achievement (e.g., a sub-plot end goal, such as obtaining the elixir of life).

The following table (Table 1) represents an example dynamic array that may be produced by the method 600 for these experience objects.

TABLE 1

| Object | Audibility | Tangibility | Visibility | Effectiveness | Resistance | Destructibility |
|---|---|---|---|---|---|---|
| A | Snoring | Adhesive, slobber | Darkness/camouflage | Attack damage | Armor class/weight | Hit points |
| B | Creaking sound | Compliance (soft spot on floor) | Wood slats misaligned | Undetectability | Lock | Material toughness |
| C | Volume | Friction (spine tingle) | Glow | Induce sleep | Weight | Counter spell protecting harp |
| D | Low pitch pulse | Texture | Brightness of light through cracks of trap door | Create elixir (ingredient) | Weight | Brittleness |
| E | NONE | Thermal | luminosity | Extend life | Puzzle (formula) | Evaporation by volume |

The following table (Table 2) represents an example attribute values stored in the dynamic array by the method 600 for player attributes.

TABLE 2

| Player | Detect Magic | Detect Pattern | Detect Anomaly | Talk with Animals | Visualize Smells | Character Strength | Magic Dagger |
|---|---|---|---|---|---|---|---|
| P1 Rogue | 0 | 150 | 130 | 0 | 100 | | 100 |
| P2 Alchemist | 140 | | | 0 | 160 | | 0 |
| P3 Whisperer | 110 | | | 150 | 120 | | 0 |

Depending on the context, the dynamic array may comprise one or more of the following for participant attributes: Detect Magic (DM); Detect Patterns (DP); Detect Anomalies (DA); Animal Communication (AC); Visualize Smells (VS); Character Strength (CS); Audibility; Kinetic; and Resistance Options (e.g., Number of hit points in NPC, Weight of an object, Damage inflicted by NPC, and Number of obstacles/protectors surrounding an Achievement).

Figure 7:
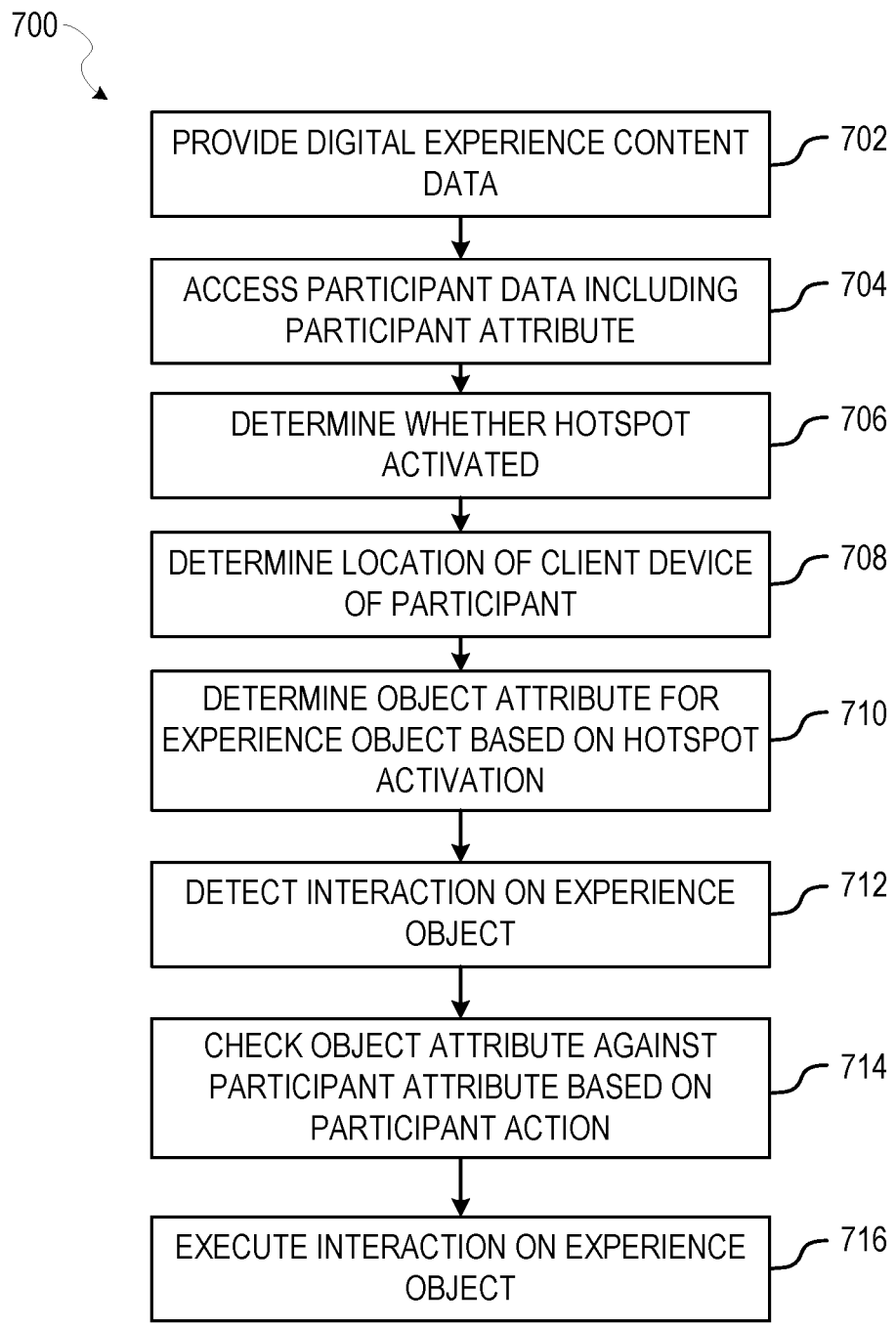
FIG. 7 is a flowchart illustrating an example method for providing a digital experience, in accordance with some embodiments.

FIG. 7 is a flowchart illustrating an example method 700 for providing a digital experience, in accordance with some embodiments. An operation of the method 700 may be performed by a hardware processor (e.g., central processing unit or graphics processing unit) of a computing device, such as desktop, laptop, server, or the like. For some embodiments, operations of the method 700 may be performed by the digital experience system 102 described with respect to FIG. 1. Though the operations of method 700 may be depicted and described in a certain order, the order in which the operations are performed may vary between embodiments. For instance, an operation may be performed before, after, or concurrently with another operation. Additionally, the modules described above with respect to the method 700 are merely examples of modules that may be used with the method 700, and that other components may also be utilized in some embodiments.

As shown, the method 700 begins with operation 702, where digital experience content data is provided (e.g., by the digital experience module 122/200) to a client device (e.g., the client system 106). The method 700 continue with operation 704, where participant data including a participant attribute of a participant is accessed (e.g., by the participant attribute module). The method 700 continue with operation 706, where activation of a hotspot of a digital experience, provided by the digital experience content data provided by operation 702, is detected (e.g., by the hotspot activation module 204). The method 700 continue with operation 708, where a physical location of a client device associated with a participant is determined (e.g., by the location module 120). The method 700 continue with operation 710, where an object attribute of an experience object of a digital experience is determined (e.g., by the object attribute determination module 206) based on (e.g., in response to) a hotspot being activated. The method 700 continue with operation 712, where an interaction on an experience object by a participant is detected (e.g., the interaction detection module 208). The method 700 continue with operation 714, where an object attribute of an experience object is checked (e.g., by the attribute check module 210) against a participant attribute of a participant experiencing a digital experience based on (e.g., in response to) an interaction on an experience object by the participant is detected. The method 700 continue with operation 716, where an interaction is executed (e.g., by the interaction execution module 212) on an experience object based on an object attribute of an experience object being checked against a participant attribute of a participant.

Figure 8:
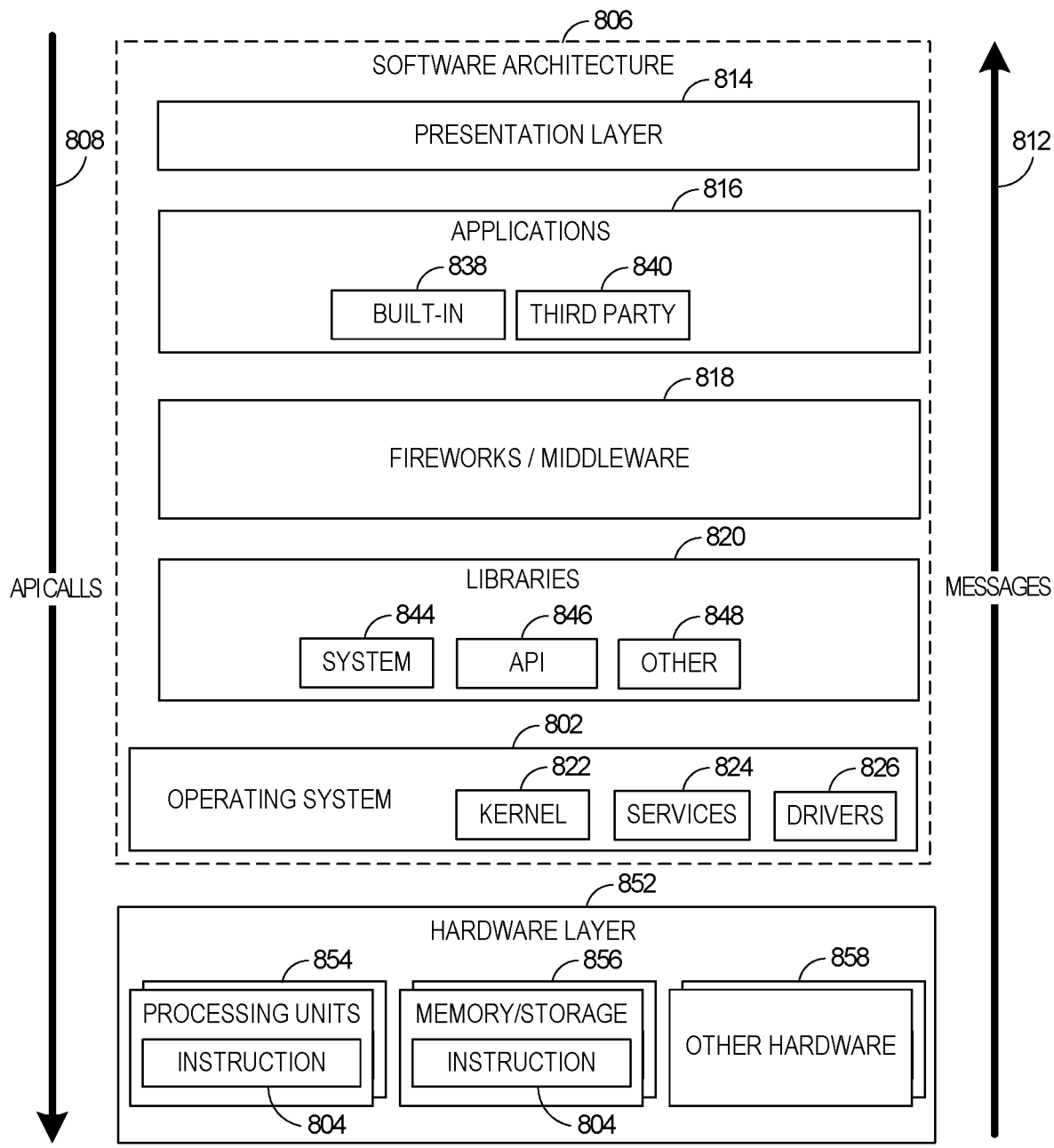
FIG. 8 is a block diagram illustrating a representative software architecture, which may be used in conjunction with various hardware architectures herein described, according to various embodiments of the present disclosure.
Figure 9:
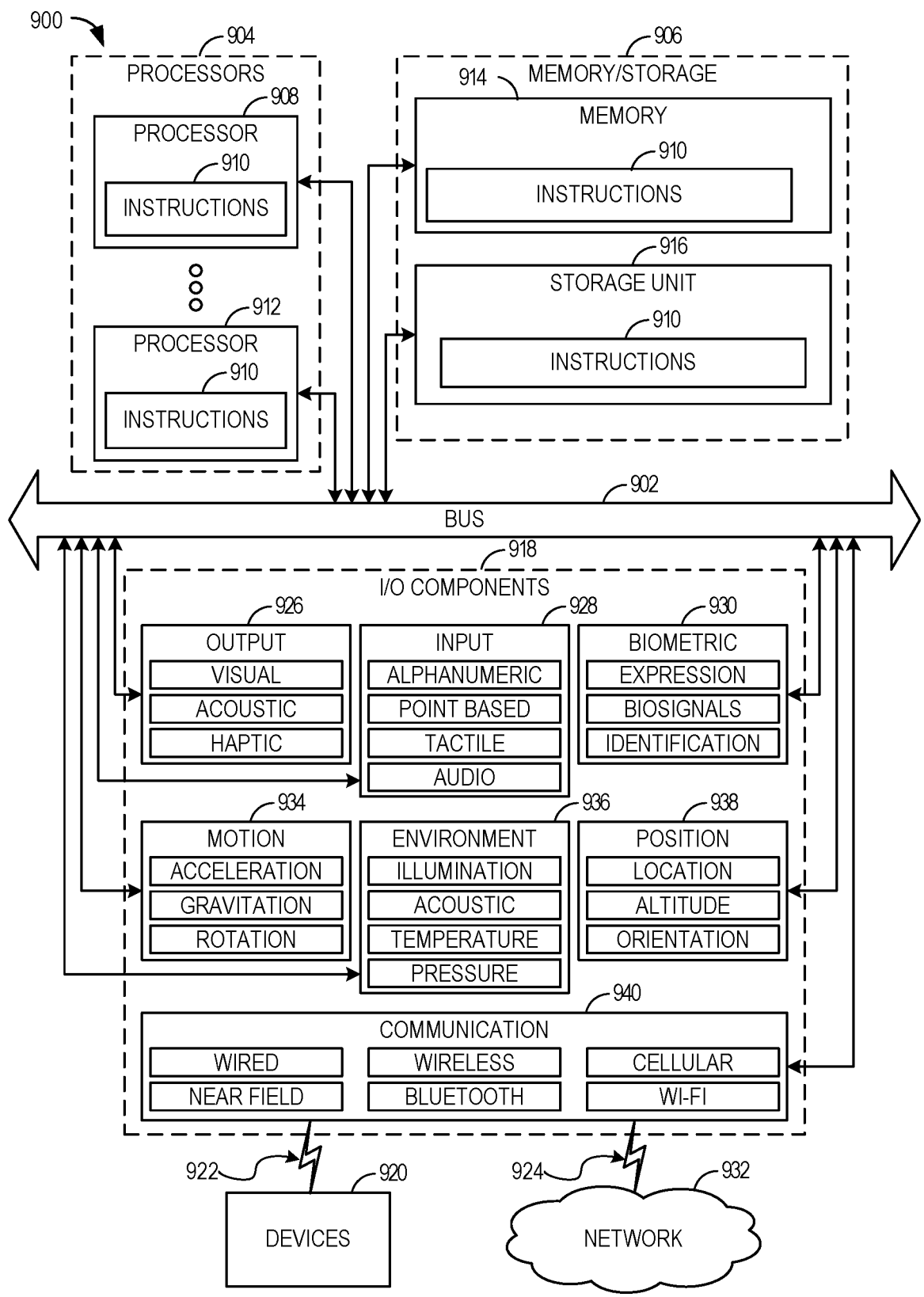
FIG. 9 is a block diagram illustrating components of a machine able to read instructions from a machine-readable medium (e.g., a machine-readable storage medium) and perform any one or more of the methodologies discussed herein according to various embodiments of the present disclosure.

Various embodiments described herein may be implemented by way of the example software architecture illustrated by and described with respect to FIG. 8 or by way of the example machine illustrated by and described with respect to FIG. 9.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components and so forth described herein. The hardware layer 852 also includes memory and/or memory/storage modules 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, applications 816 and a presentation layer 814. Operationally, the applications 816 and/or other components within the layers may invoke application programming interface (API) calls 808 through the software stack and receive messages 812 in response to the API calls 808. The layers illustrated are representative in nature and not all software architectures have all layers. For example, some mobile or special purpose operating systems 802 may not provide a frameworks/middleware 818, while others may provide such a layer. Other software architectures may include additional or different layers.

The operating system 802 may manage hardware resources and provide common services. The operating system 802 may include, for example, a kernel 822, services 824 and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be used by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a video game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built-in operating system functions (e.g., kernel 822, services 824 and/or drivers 826), libraries 820, and frameworks/middleware 818 to create user interfaces to interact with users of the system. Alternatively, or additionally, in some systems, interactions with a user may occur through a presentation layer, such as presentation layer 814. In these systems, the application/component "logic" can be separated from the aspects of the application/component that interact with a user.

FIG. 9 is a block diagram illustrating components of a machine 900, according to some example embodiments, able to read instructions 804 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 900 capable of executing the instructions 910, sequentially or otherwise, that specify actions to be taken by machine 900. Further, while only a single machine 900 is illustrated, the term "machine" shall also be taken to include a collection of machines 900 that individually or jointly execute the instructions 910 to perform any one or more of the methodologies discussed herein.

The machine 900 may include processors 904, memory memory/storage 906, and I/O components 918, which may be configured to communicate with each other such as via a bus 902. The processors 904 may comprise of a single processor or, as shown, comprise of multiple processors (e.g., processors 908 to 912). The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor 908's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environment components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

It will be understood that various components (e.g., modules) used in this context (e.g., system components) refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A hardware component is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 908 or a group of processors 904) may be configured by software (e.g., an application 816 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 908 or other programmable processor 908. Once configured by such software, hardware components become specific machines (or specific components of a machine 900) uniquely tailored to perform the configured functions and are no longer general-purpose processors 904. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 908 configured by software to become a special-purpose processor, the general-purpose processor 908 may be configured as respectively different special-purpose processors (e.g., comprising different hardware components) at different times. Software accordingly configures a particular processor 908 or processors 904, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor 908 or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 932 (e.g., the Internet) and via one or more appropriate interfaces (e.g., an application program interface (API)). The performance of certain of the operations may be distributed among the processors 904, not only residing within a single machine 900, but deployed across a number of machines 900. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-STORAGE MEDIUM," "device-storage medium," "computer-storage medium" (referred to collectively as "machine-storage medium") in this context refer to the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below.

With respect to "EXECUTABLE INSTRUCTIONS" and "MACHINE-STORAGE MEDIUM," the various memories (i.e., 914, and/or memory of the processor(s) 904) and/or storage unit 916 may store one or more sets of instructions 910 and data structures (e.g., software) embodying or utilized by any one or more of the methodologies or functions described herein. These instructions, when executed by processor(s) 904 cause various operations to implement the disclosed embodiments.

"SIGNAL MEDIUM" or "transmission medium" in this context shall be taken to include any form of modulated data signal, carrier wave, and so forth. The term "modulated data signal" means a signal that has one or more of its characteristics set or changed in such a matter as to encode information in the signal.

"MACHINE-READABLE MEDIUM," "computer-readable medium" and "device-readable medium" in this context refer the same thing and may be used interchangeably in this disclosure. The terms are defined to include both machine-storage media and signal media. Thus, the terms include both storage devices/media and carrier waves/modulated data signals.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a central processing unit (CPU), a Reduced Instruction Set Computing (RISC) processor, a Complex Instruction Set Computing (CISC) processor, a graphics processing unit (GPU), a digital signal processor (DSP), an application specific integrated circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases, such as "one or more," "at least," "but not limited to" or other like phrases, shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

It will be understood that changes and modifications may be made to the disclosed embodiments without departing from the scope of the present disclosure. These and other changes or modifications are intended to be included within the scope of the present disclosure.

What is claimed is:

1. A system comprising
a participant attribute module, implemented using one or more processors, to access a set of participant attributes for a participant;
a location module, implemented using one or more processors, to determine a physical location of a client device associated with the participant;
a digital experience module, implemented using one or more processors, to provide digital experience content data to the client device, the digital experience content data enabling the client device to provide the participant with a digital experience based on the digital experience content data, the digital experience comprising a set of experience objects, the digital experience comprising a digital narrative experience, the set of experience objects comprising at least one narrative branch path to a narrative that determines content provided to the participant from the digital narrative experience, the digital narrative experience comprising at least one point where a narrative branch path is selected from a plurality of narrative branch paths, and an object attribute of at least one experience object in the set of experience objects being determined based on at least one of the physical location of the client device or a participant attribute from the set of participant attributes.

2. The system of claim 1, wherein the object attribute of the at least one experience object is determined based on whether a threshold associated with the object attribute has at least been met by at least one of the physical location of the client device or the participant attribute from the set of participant attributes.

3. The system of claim 1, wherein the participant attribute comprises a participant collected achievement.

4. The system of claim 3, wherein the participant collected achievement comprises an achievement collected by the participant while experiencing the digital experience provided by the client device based on the digital experience content data.

5. The system of claim 3, wherein the participant collected achievement comprises an achievement collected by the participant while experiencing another digital experience based on other digital experience content data.

6. The system of claim 3, wherein the participant collected achievement comprises an achievement collected based on data that indicates that the participant performed an activity in a real-world environment.

7. The system of claim 6, wherein the activity comprises the client device associated with the participant visiting a real-world location.

8. The system of claim 1, wherein the digital experience includes a set of hotspots including at least one hotspot at which the at least one experience object being is determined.

9. The system of claim 1, wherein the set of experience objects further comprises at least one of a virtual object, a musical score, an achievement, or a virtual environment sound.

10. A method comprising:
providing, by one or more processors, digital experience content data to a client device associated with a participant, the digital experience content data enabling the client device to provide the participant with a digital experience based on the digital experience content data, and the digital experience comprising a set of experience objects, the digital experience comprising a digital narrative experience, the set of experience objects comprising at least one narrative branch path to a narrative that determines content provided to the participant from the digital narrative experience, the digital narrative experience comprising at least one point where a narrative branch path is selected from a plurality of narrative branch paths;
accessing, by the one or more processors, participant data that includes a set of participant attributes associated with the participant;
determining, by the one or more processors, whether the participant has activated a hotspot of the digital experience; and
in response to determining that the participant activated the hotspot, determining, by the one or more processors, a set of object attributes for at least one experience object in the set of experience objects, the determining being based on at least one participant attribute in the set of participant attributes.

11. The method of claim 10, further comprising:
detecting, by the one or more processors, an interaction by the participant on the at east one experience object;
in response to detecting the interaction, checking, by the one or more processors, at least one of the set of object attributes against at least one relevant participant attribute in the set of participant attributes; and
executing, by the one or more processors, the interaction on the at least one experience object based on the checking.

12. The method of claim 10, wherein at least one object attribute, in the set of object attributes, is determined based on whether a threshold associated with the at least one object attribute has at least been met by the at least one participant attribute from the set of participant attributes.

13. The method of claim 10, further comprising:
determining, by the one or more processors, a physical location of the client device, the set of object attributes being determined further based on the physical location.

14. The method of claim 13, wherein at least one object attribute, in the set of object attributes, is determined based on whether a threshold associated with the at least one object attribute has at least been met by the physical location of the client device.

15. The method of claim 10, wherein at least one object attribute, in the set of object attributes, comprises a participant collected achievement.

16. The method of claim 15, wherein the participant collected achievement comprises an achievement collected by the participant while experiencing in the digital experience provided by the client device based on the digital experience content data.

17. The method of claim 15, wherein the participant collected achievement comprises an achievement collected by the participant while experiencing another digital experience based on other digital experience content data.

18. The method of claim 15, wherein the participant collected achievement comprises an achievement collected based on data that indicates that the participant performed an activity in a real-world environment.

19. The method of claim 18, wherein the activity comprises the client device associated with the participant visiting a real-world location.

20. The method of claim 10, wherein the set of experience objects further comprises at least one of a virtual object, a musical score, an achievement, or a virtual environment sound.

21. A non-transitory computer storage medium comprising instructions that, when executed by a processor of a device, cause the device to perform operations comprising:

providing digital experience content data to a client device associated with a participant, the digital experience content data enabling the client device to provide the participant with a digital experience based on the digital experience content data, and the digital experience comprising a set of experience objects, the digital experience comprising a digital narrative experience, the set of experience objects comprising at least one narrative branch path to a narrative that determines content provided to the participant from the digital narrative experience, the digital narrative experience comprising at least one point where a narrative branch path is selected from a plurality of narrative branch paths;

accessing participant data that includes a set of participant attributes associated with the participant;

determining whether the participant has activated a hotspot of the digital experience; and in response to determining that the participant activated the hotspot, determining, by the one or more processors, a set of object attributes for at least one experience object in the set of experience objects, the determining being based on at least one participant attribute in the set of participant attributes.

* * * * *